US008106297B1

(12) United States Patent
Kiely

(10) Patent No.: US 8,106,297 B1
(45) Date of Patent: Jan. 31, 2012

(54) GROUNDED CONDUIT BUSHING

(75) Inventor: Kenneth M. Kiely, Milford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 322 days.

(21) Appl. No.: 12/586,604

(22) Filed: Sep. 24, 2009

(51) Int. Cl.
*H02G 15/02* (2006.01)

(52) U.S. Cl. .............. 174/78; 174/51; 439/100; 439/92; 285/404

(58) Field of Classification Search ................. 285/404; 174/78, 51; 439/100, 92, 534, 814
See application file for complete search history.

(56) References Cited

U.S. PATENT DOCUMENTS

| | | | |
|---|---|---|---|
| 3,967,872 A | | 7/1976 | Mooney et al. |
| 4,210,374 A | | 7/1980 | Churla |
| 4,954,084 A | * | 9/1990 | Pugh et al. ...................... 439/29 |
| 6,548,761 B1 | * | 4/2003 | Wang .......................... 174/74 R |
| 6,933,442 B2 | * | 8/2005 | Franks, Jr. ....................... 174/51 |
| 7,044,776 B2 | * | 5/2006 | King et al. ..................... 439/521 |
| 7,165,980 B2 | | 1/2007 | Pyron et al. |
| 7,182,611 B2 | * | 2/2007 | Borden et al. .................. 439/92 |

* cited by examiner

*Primary Examiner* — Dhirubhai R Patel
(74) *Attorney, Agent, or Firm* — Alfred A. Fressola; Ware, Fressola, Van Der Sluys & Adolphson LLP

(57) ABSTRACT

By providing a grounding conductor assembly affixed to a conduit bushing in a manner which enables the grounding conductor assembly to extend inwardly from the bushing, effectively being positioned coaxially with the inside diameter of the rigid metal conduit, conduit bushing is realized which enables all grounding wires to be quickly and easily mounted to the grounding conductor assembly. The conduit bushing of the present invention includes a generally circular shaped cover or cap member mounted to the terminating end of the conduit and incorporating an enlarged aperture which overlies the elongated passageway formed in the conduit. In this way, the electrical power carrying wires are able to extend outwardly from the rigid metal conduit into the desired outlet box, junction box with the grounding wire being quickly affixed to the receiving zone of the grounding connector assembly.

10 Claims, 3 Drawing Sheets

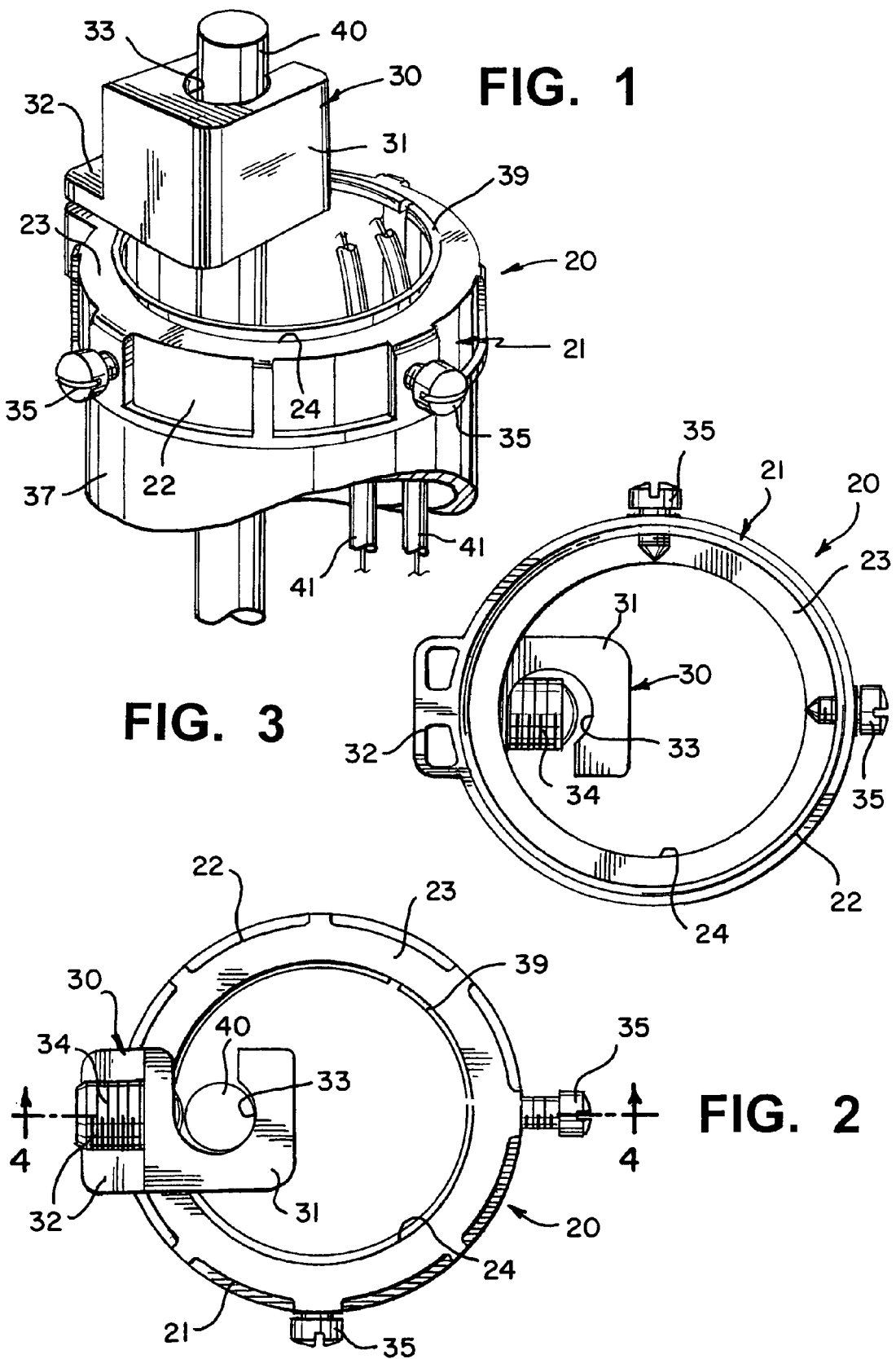

GROUNDED CONDUIT BUSHING

TECHNICAL FIELD

This invention relates to rigid metal conduits for electrical wiring and, more particularly, to grounding bushings constructed for mounting to rigid metal conduits.

BACKGROUND ART

In the field of wiring homes and buildings, whether for new construction or for improvements or expansion, substantial development and product improvements have been made. Typically, these improvements are directed to enabling installers to securely and safely mount any desired wiring in any desired location in the most efficient and quickest manner.

In any particular installation or location, various rigid metal conduits are often employed by being interconnected to each other, as well as connected to the primary power supply and a suitable power distributing outlet box, junction box, or other enclosure. In these instances, a plurality of electrical power carrying wires are contained in each rigid metal conduit, with each rigid metal conduit being securely mounted to the housing of the junction box, outlet box, or other appropriate mounted location, with each of the electrical power carrying wires contained therein being secured to various locations and/or connectors.

In this regard, various electrical codes or requirements have been established which are directed to the installation of a grounding conductor between electrical conduits and metal enclosures. In order to comply with these requirements, conduit bushings constructed for being mounted to the terminating end of metal conduits typically incorporate grounding devices or connectors mounted thereto for use in providing the required grounding path. However, in all of these prior art constructions, the grounding connector mounted to the conduit bushing is mounted to the outer peripheral surface of the bushing, radially extending outwardly therefrom.

In many installations, the placement of the grounding connector to the outer peripheral surface of the conduit bushing provides no difficulty or drawback since the grounding wire employed is mounted externally of the conduit and is therefore easily interconnected with the grounding connector for connecting the conduit to the desired grounded location. However, in other installations, the electrical wires contained in the rigid metal conduit incorporate a ground wire which must be connected to the grounding connector which is mounted to the outer peripheral surface of the conduit bushing. In these instances, the construction of conventional grounded conduit bushings provides installers with added difficulty and substantial inconvenience.

Due to the requirements established by the electrical codes, the gauge or thickness of the electrical wires contained in the rigid metal conduits is substantial, requiring substantial force to be applied in order to manipulate the wires contained in the conduit. In particular, in those instances in which the grounding wire is contained within the rigid metal conduit, the installer is required to use substantial force to manipulate the grounding wire from its position within the metal conduit to a position in which the terminating end of the grounding wire is able to be mounted into the grounding connector affixed to the outer peripheral surface of the conduit bushing. As a result, the installer is required to employ substantial effort, while also experiencing a substantial inconvenience.

Therefore, it is a principal object of the present invention to provide a conduit bushing for rigid metal conduits which enables grounding wires to be affixed thereto quickly and easily, without requiring excessive manipulation or twisting of the grounding wires.

Another object of the present invention is to provide a conduit bushing having the characteristic features described above which enables grounding wires contained in rigid metal conduits to be quickly and easily securely mounted to a grounding connector in a simple, direct, and efficient manner.

Another object of the present invention is to provide a conduit bushing having the characteristic features described above which is universally applicable to all rigid metal conduits for enabling grounding wires to be quickly and easily affixed to the desired grounded location without requiring excessive force or manipulation.

Other and more specific objects will in part be obvious and will in part appear hereinafter.

SUMMARY OF THE INVENTION

By employing the present invention, all of the difficulties and drawbacks of prior art systems have been overcome and an efficient, easily manufactured, conduit bushing is realized which enables all grounding wires to be quickly and easily mounted to a grounding conductor assembly integrally mounted to the conduit bushing. In the preferred construction of the conduit bushing of the present invention, the grounding conductor assembly is affixed to the conduit bushing in a manner which enables the grounding conductor assembly to extend inwardly from the bushing, effectively being positioned coaxially with the inside diameter of the rigid metal conduit.

As is well known in the art, rigid metal conduits typically comprise elongated, longitudinally extending, hollow cylindrically shaped members in which the desired electrical power carrying wires are contained. In addition, the terminating end of the rigid metal conduits are often threaded, to enable the conduit bushing to be quickly and easily secured to the terminating end of the conduit by threaded interengagement therewith.

In order to enable the desired electrical power carrying wires to extend into any desired power distributing outlet box, junction box, or other enclosure, while also completing the mounting of the conduit to the desired outlet box, junction box, or other enclosure, the conduit bushing comprises a generally circular shaped cover or cap member mounted to the terminating end of the conduit and incorporating an enlarged aperture which overlies the elongated passageway formed in the conduit and enables the electrical power carrying wires to extend outwardly from the rigid metal conduit into the desired outlet box, junction box, or other enclosure.

By employing the conduit bushing, the terminating end of the conduit is inserted into a receiving aperture formed in the outlet box, junction box, or other enclosure after a locking ring is affixed on the threaded end of the conduit. Then, the conduit bushing is affixed to the terminating end of the conduit, enabling the electrical power carrying wires to extend outwardly from the conduit through the conduit bushing and into the outlet box, junction box, or other enclosure. In this way, the desired connections can be made for each of the electrical power carrying wires contained in the conduit.

As discussed above, in order to be certain that a safe and effective assembly is realized, grounding wires must be installed and properly connected. In addition, since numerous applications incorporate grounding wires which are mounted in the rigid metal conduit along with the electrical power carrying wires, the conduit bushing of the present invention enables the rapid securement and safe and effective connection of the grounding wires to the conduit bushing.

In the preferred construction of the conduit bushing of the present invention, the conduit bushing comprises a circular shaped end cap or cover body construction comprising a dimension for being mounted to the outer diameter of the desired rigid metal conduit. In addition, in the preferred embodiment, the inside wall of the end cap/cover body is threaded for enabling the conduit bushing to be quickly and easily threadedly mounted to the terminating end of the conduit.

In addition, the conduit bushing also incorporates an enlarged aperture or portal formed in the end wall of the end cap/cover body comprising a diameter substantially equivalent to the inside diameter of the metal conduit. In addition, a plastic ring is frictionally mounted to the terminating end of the enlarged aperture or portal for providing a smooth surface over which the electrical power carrying wires can be advanced without causing damage to the outer surface thereof, while also providing a non-electrically conductive surface on which the power carrying wires can rest.

Finally, in the preferred embodiment of the present invention, a grounding connector assembly is mounted to an outer surface of the end cap/cover body forming the conduit bushing, with the grounding connector assembly comprising an electrical wire mounting block and a support flange or plate. Furthermore, the electrical wire mounting block incorporates a holding zone formed therein which is dimensioned for enabling the terminating end of the grounding wire to be quickly and easily inserted into the holding zone and securely retained and affixed therein.

In addition, in order to achieve the unique construction and enhanced benefits provided by the conduit bushing of the present invention, the holding zone of the electrical wire mounting block is positioned in coaxial alignment with the central passageway formed in the rigid metal conduit. As a result of this construction, the grounding wire which is mounted in the rigid metal conduit for longitudinally extending in the central passageway thereof along with the plurality of other electrical power carrying wires, is able to be quickly and easily positioned in secure, mounted engagement in the holding zone of the electrical wire mounting block, without requiring the installer to employ extensive effort and exert substantial force to manipulate, twist and/or deform the grounding wire in order to position the grounding wire in engagement with the holding zone. As a result, speed, efficiency, and convenience are realized.

The invention accordingly comprises an article of manufacture possessing the features, properties, and the relation of elements which will be exemplified in the article hereinafter described, and the scope of the invention will be indicated in the claims.

THE DRAWINGS

For a fuller understanding of the nature and objects of the invention, reference should be had the following detailed description taken in connection with the accompanying drawings, in which:

FIG. 1 is a perspective view of the conduit bushing of the present invention shown mounted to the terminating end of a rigid metal conduit with a grounding but wire mounted in the electrical wire mounting block thereof;

FIG. 2 is a top plan view of the conduit bushing of FIG. 1;

FIG. 3 is a bottom plan view of the conduit bushing of FIG. 1;

DETAILED DESCRIPTION

Figure 4:
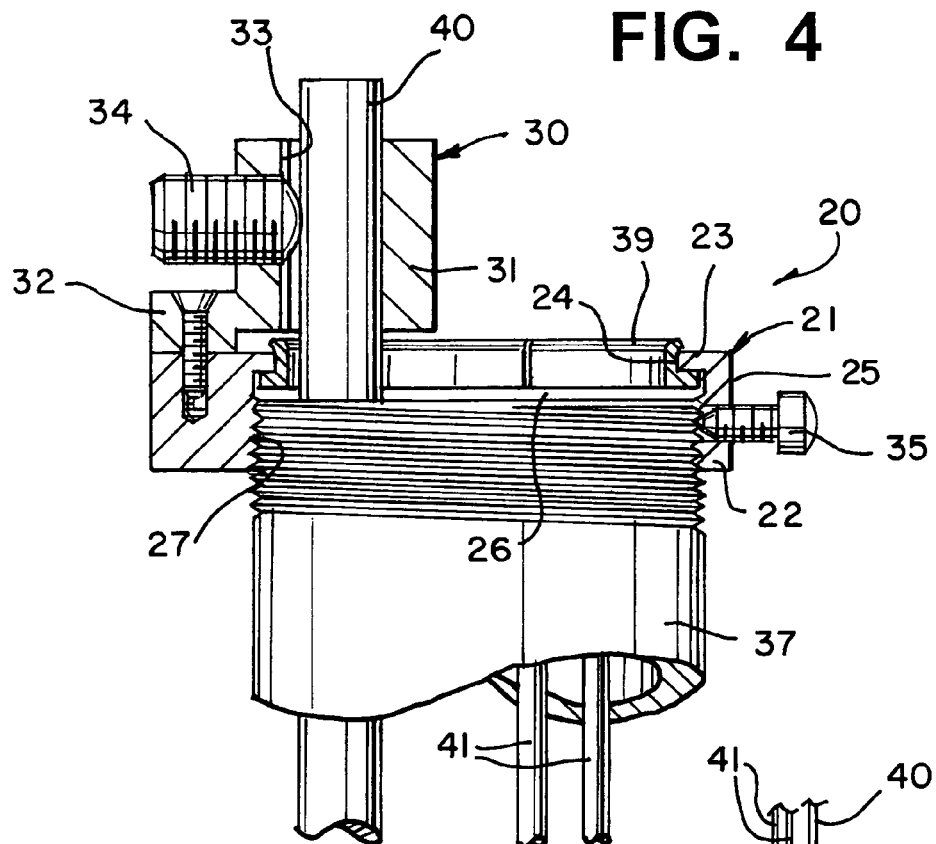
FIG. 4 is a cross-sectional side elevation view of the conduit bushing of the present invention, taken along the line 4-4 of FIG. 1.

By referring to the FIGS. 1-7, along with the following detailed discussion, the construction and operation of alternate preferred embodiments of grounded conduit bushing 20 can best be understood. In addition, although several alternate preferred embodiments are disclosed herein, as the best mode for carrying out the present invention, it is to be understood that these embodiments are merely exemplary of preferred constructions, and further alternate embodiments can be made without departing from the scope of the present invention. Consequently, these alternate constructions are intended to be within the scope of the present invention.

As shown in FIGS. 1-4, grounded conduit bushing 20 comprises a generally circular shaped member or body 21 formed as an end cap or cover incorporating a circular shaped flange portion 22, end wall 23, and enlarged aperture 24 formed in end wall 23. In addition, in the preferred embodiment depicted, circular flange portion 22 comprises outside surface 25, inside surface 26, and threaded zone 27 formed in inside surface 26. As is more fully detailed below, threaded zone 27 is employed in one preferred embodiment of the present invention, however, threaded zone 27 is not required and can be eliminated if desired by the user.

In completing the construction of grounded conduit bushing 20 of the present invention, bushing 20 incorporates grounding conductor assembly 30 mounted to end wall 23 of body 21. In its preferred embodiment, grounding conductor assembly 30 comprises electrical wire mounting block 31 and support flange or plate 32.

Furthermore, as clearly depicted in FIGS. 1-4, mounting block 31 incorporates wire holding zone 33 formed therein and dimensioned for enabling grounding wire 40 to be quickly and easily inserted therein and maintained in secure grounded retention. In order to assure the desired secure retention of grounding wire 40 in holding zone 33, mounting block 31 also incorporates set screw 34 associated therewith and positioned for engaging and securely retaining grounding wire 40 in the desired position in holding zone 33 of mounting block 31.

As depicted, in accordance with the present invention, grounding conductor assembly 30 is mounted to end wall 23 of body 21 of grounded conduit bushing 20 in a manner which enables grounded conductor assembly 30 to be coaxially aligned with aperture 24 of bushing 20. In this way, holding zone 33 of mounting block 31 is in coaxial alignment with aperture 24 of bushing 20.

As discussed above, elongated, hollow, rigid metal conduits or tubes 37 are commonly employed for carrying a plurality of power carrying wires or cables 41. In this way, the desired electrical power in a particular building or installation can be efficiently contained and distributed to desired locations. Furthermore, as previously detailed, the elongated, hollow, rigid metal conduits or tubes 37 frequently contain a threaded zone formed at the distal ends thereof, in order to enable metal conduit 37 to be securely mounted in various desired locations, such as power distributing junction boxes, outlet boxes, or other enclosures.

In addition to containing power carrying wires 41, many typical installations also position grounding wires/cables 40 in rigid metal conduits 37 in association with power carrying wires 41. As a result, whenever a prior art grounded conduit bushing is employed, with its grounding wire mounting block affixed to the outside surface of the bushing and radially extending outwardly therefrom, substantial effort is required for the installer to position the grounding wire/cable 40 in the receiving zone of the wire mounting block. However, by employing grounded conduit bushing 20 of the present invention, all of these labor-intensive requirements are completely eliminated.

As clearly depicted in FIGS. 1-4, power carrying wires 41 and grounding wire 40 are positioned in elongated, hollow, rigid metal conduit 37, longitudinally extending through conduit 37 substantially co-axially with the internal passageway formed therein. As fully detailed below, in many typical installations, rigid metal conduit 37 is mounted to a desired power distributing junction box, outlet box, or other enclosure with grounded conduit bushing 20 threadedly engaged to the threaded end of rigid metal conduit 37.

In most installations, rigid metal conduit 37 is inserted through an aperture formed in the junction box, outlet box, or other enclosure, with a locking ring mounted to the end of conduit 37 and positioned for engaging the outer surface of the aperture through which rigid metal conduit 37 is inserted. Then, in order to securely affix rigid metal conduit 37 to the junction box, outlet box, or other enclosure, grounded conduit bushing 20 is mounted to the end of rigid metal conduit 37 extending into the junction box, outlet box, or other enclosure. When all these components are fully secured, rigid metal conduit 37 is affixed in the desired position to the particular junction box, outlet box, or other enclosure.

In addition, once rigid metal conduit 37 is mounted in the desired manner, power carrying wires 41 and grounding wire 40 are able to extend outwardly from rigid metal conduit 37 through aperture 24 of grounded conduit bushing 20. In this way, power carrying wires 41 are extended into the junction box, outlet box, or other enclosure for being secured to the desired contacts, switches, or associated wires.

Although prior art conduit bushings would require the installer to expend a substantial effort in mounting grounding wire 40 to the prior art wire mounting block, the present invention eliminates any such extensive effort and difficulty, and provides a construction which is quickly and easily achieved by the installer. In this regard, as is clearly evident from FIGS. 1-4, in the present invention, holding zone (passageway) 33 of electrical wire mounting block 31 of grounding conduit assembly 30 of conduit bushing 20 is positioned in coaxial alignment with the central passageway of rigid metal conduit 37. As a result, grounding wire 40 is automatically positioned in co-axial alignment with holding zone 33, enabling the installer to quickly and easily position grounding wire 40 in holding zone 33 of electrical wire mounting block 31.

By employing the present invention, the installer merely selects grounding wire 40 from its position extending outwardly from rigid metal conduit 37 and quickly and easily places grounding wire 40 in holding zone 33 of electrical wire mounting block 31. Once in holding zone 33, set screw 34 is rotated for causing set screw 34 to advance into secure abutting contacted relationship with grounding wire 40, thereby securing grounding wire 40 in holding zone 33 of electrical wire mounting block 31. In this quick, simple, and straight-forward manner, the installer is able to securely mount grounding wire 40 in the precisely required location, with speed and efficiency.

In the preferred embodiment, grounded conduit bushing 20 also incorporates locking screws 35 which are threadedly mounted in flange portion 22. As depicted in FIG. 4, locking screws 35 are employed to secure grounded conduit bushing 20 to rigid metal conduit 37, once bushing 20 has been threadedly affixed to the threaded terminating end of rigid metal conduit 37. In this way, the desired secure affixation of rigid metal conduit 37 in the desired location is assured.

In addition, in the preferred construction, grounded conduit bushing 20 also incorporates plastic ring 39 mounted in aperture 24 securely engaged with the terminating edge thereof. In this way, sharp edges are avoided and any possibility of unwanted scraping or cutting of the outer surface of power carrying wires 41 or grounding wire 40 is eliminated.

As is evident from the foregoing detailed discussion, the use of grounded conduit bushing 20 of the present invention enables grounding wires to be quickly and easily mounted to an electrical wire mounting block for achieving the desired grounded connection. By providing a grounded conduit bushing wherein the grounding conductor assembly is mounted to the end wall of the bushing for radially extending inwardly, the holding zone of the grounding conductor assembly is positioned coaxially with the grounding wires contained in the rigid metal conduit. As a result, assembly ease is achieved and unwanted, labor-intensive efforts are avoided.

Figure 5:
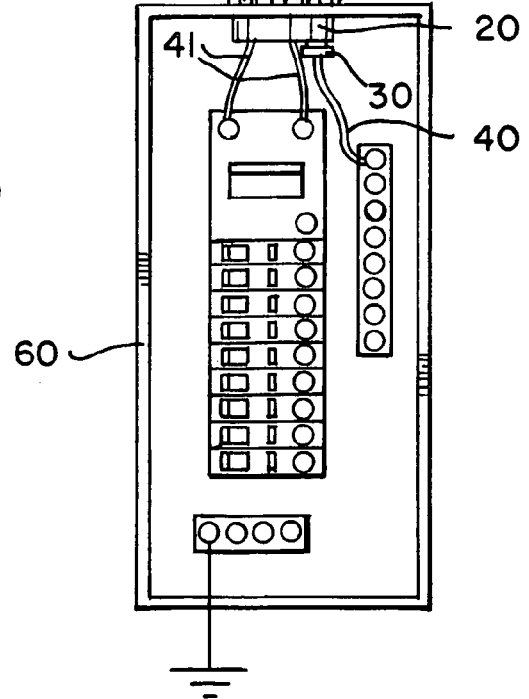
FIG. 5 is a diagrammatic view depicting a typical installation employing the conduit bushing of the present invention.

By referring to FIG. 5, a typical installation employing grounded conduit bushing 20 of the present invention is depicted. Although this installation represents one typical application wherein the benefits of the present invention are achieved, the installation depicted in FIG. 5 is merely one example of numerous alternate examples in which grounded conduit bushing 20 of the present invention can be employed effectively and efficiently.

In FIG. 5, junction box 60 is depicted with the elongated, hollow, rigid metal conduit 37 mounted through an aperture formed in junction box 60. In addition, locking ring 36 is affixed to the threaded end of rigid metal conduit 37, prior to the insertion of metal conduit 37 through the aperture of junction box 60, thereby enabling the threaded terminating end of conduit 37 to protrude through the aperture formed in junction box 60. Once this position has been achieved, grounded conduit bushing 20 is threadedly mounted to the threaded terminating end of conduit 37, securely mounting and positioning metal conduit 37 in the desired location in association with junction box 60.

Once secured in place, grounding wire 40 and power carrying wires 41 are extended through aperture 24 of grounded conduit bushing 20 with power carrying wires 41 being connected to the desired switches or contacts. In addition, grounding wire 40 is quickly and easily positioned in holding zone 33 of electrical wire mounting block 31 of grounding conductor assembly 30 and affixed thereto with ease and simplicity. Thereafter, grounding wire 40 is also extended from grounding conductor assembly 30 to a desired grounded location of junction box 60. In this way, the complete assembly of the desired junction box is achieved in a manner which enables installers to work efficiently and effectively, without incurring undue difficulties or wire manipulations.

Figure 6:
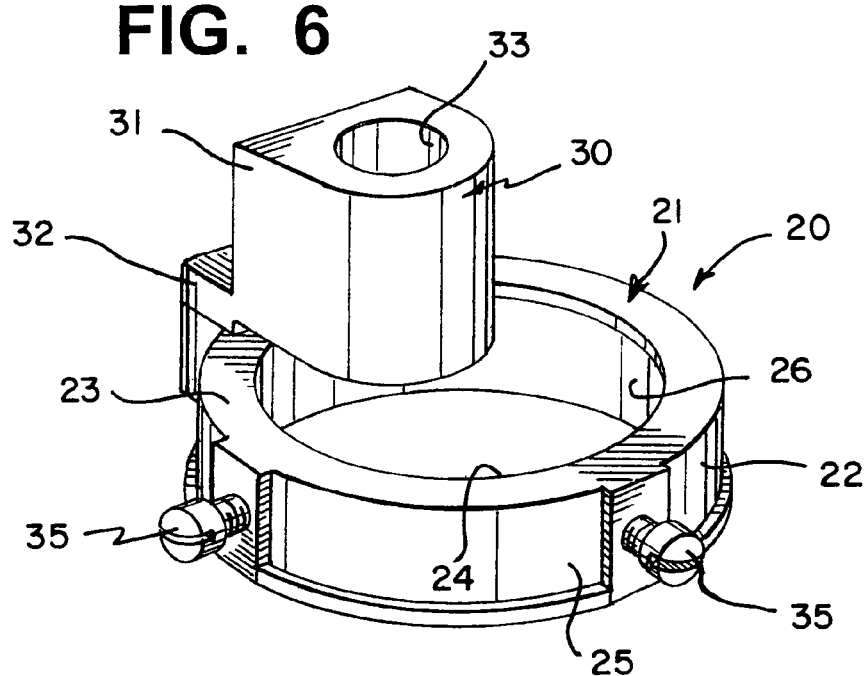
FIGS. 6 and 7 are perspective views of alternate embodiments of the conduit bushing of the present invention.
Figure 7:
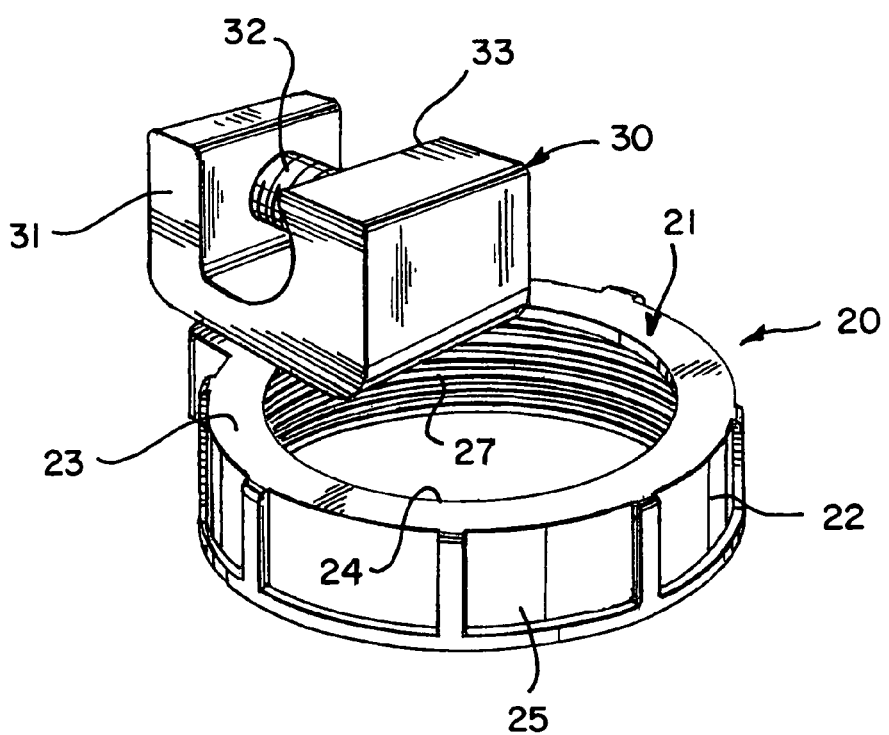

By referring to FIGS. 6 and 7, two alternate embodiments of grounded conduit bushing 20 of the present invention are depicted. In each of these embodiments, grounded conduit bushing 20 incorporates circular shaped member or body 21 formed as an end cap or cover incorporating circular shaped flange portion 22, end wall 23, and enlarged aperture 24 formed in end wall 23.

In the embodiment of FIG. 6, circular flange portion 22 comprises outside surface 25 and inside surface 26 which is devoid of any threaded zone formed in inside surface 26. In this embodiment, grounded conduit bushing 20 is frictionally mounted to the terminating end of an associated rigid metal conduit as opposed to being threadedly mounted to the terminating end of the conduit.

As is evident from a review of FIGS. 6 and 7, circular shaped member or body 21 comprises a generally similar or identical construction, as detailed above. However, in each of these embodiments, alternate constructions for grounding conductor assembly 30 are employed. In this regard, each grounding conductor assembly 30 incorporates a uniquely constructed electrical wire mounting block 31 using alternate visual appearances and configurations. However, in each of the constructions, holding zone 33 extends inwardly from end wall 23, positioning holding zone 33 co-axially with the central passageway of rigid metal conduit 37 for enabling grounding wire 40 to be secured in the desired position with ease and simplicity. As a result, all of the benefits detailed above are achieved with equal efficacy whenever these alternate embodiments are employed.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

Having described my invention, what I claim as new and desired to secure by Letters Patent is:

The invention claimed is:

1. A grounded conduit bushing constructed for being mounted to the terminating end of an elongated, hollow, substantially cylindrically shaped rigid metal conduit in which a grounding wire is positioned, comprising:
   A. a circular shaped body member formed as an end cap or cover comprising
      a) an end wall,
      b) a circular shaped flange peripherally surrounding the end wall and extending substantially perpendicularly therefrom, and
      c) an enlarged aperture formed in the end wall and comprising a major portion of the surface area thereof;
   B. a grounding conductor assembly mounted to the surface of the end wall and extending therefrom into overlying unaligned relationship with the aperture formed in said end wall and comprising:
      a) a support flange or plate mounted to the surface of the end wall,
      b) an electrical wire mounting block affixed to the support flange/plate, and
      c) a holding zone formed in the electrical wire mounting block and positioned in axial alignment with the aperture formed in the end wall of the circular shaped body member for enabling the grounding wire contained in the rigid metal conduit to be quickly and easily positioned and retained therein.

2. The grounded conduit bushing defined in claim 1, wherein said grounding conductor assembly further comprises a mounting screw threadedly engaged in the mounting block and positioned for co-operative locking interengagement with the grounding wire when said grounding wire is positioned in the holding zone thereof.

3. The grounded conduit bushing defined in claim 2, wherein said grounded conduit bushing further comprises a threaded zone formed on the inside surface of the circular shaped flange and constructed for being threadedly mounted to the rigid metal conduit incorporating a threaded zone formed at the terminating end thereof.

4. The grounded conduit bushing defined in claim 1, wherein said holding zone of said electrical wire mounting block of the grounding conductor assembly is further defined as comprising a passageway formed therein, with said passageway extending co-axially with the central axis of the rigid metal conduit through which said conduit bushing is mounted.

5. The grounded conduit bushing defined in claim 4, wherein said passageway formed in the mounting block is open on one side thereof, enabling the grounding wire to be quickly and easily inserted into the holding zone of the mounting block.

6. The grounded conduit bushing defined in claim 4, wherein said passageway formed in the mounting block is further defined as being closed on the sides thereof, thereby requiring the grounding wire to be axially inserted into the passageway for mounting therein.

7. The grounded conduit bushing defined in claim 1, wherein said electrical wire mounting block of the grounding conductor assembly is further defined as comprising an overall shape selected from the group consisting of squares, rectangles, circles, ovals, and combinations thereof.

8. The grounded conduit bushing defined in claim 1, wherein said holding zone of said electrical wire mounting block of the grounding conductor assembly is further defined as comprising a passageway formed therein which is positioned in cooperating alignment with the aperture formed in the end wall of the circular shaped body member with the axis of said passageway extending transversely to the central axis of the aperture.

9. The grounded conduit bushing defined in claim 1, wherein said grounded conduit bushing further comprises a plurality of locking screws mounted to the circular shaped flange for enabling said conduit bushing to be securely affixed to the rigid metal conduit whenever said conduit bushing is mounted in the desired position.

10. The grounded conduit bushing defined in claim 1, wherein said circular shaped flange incorporates a smooth inside surface for enabling said grounded conduit bushing to be quickly mounted to any desired rigid metal conduit for being retained thereon by frictional engagement.

\* \* \* \* \*